United States Patent [19]

Bocker

[11] 4,110,004
[45] Aug. 29, 1978

[54] COMPLEX PHOTODICHROIC SPATIAL FILTER

[75] Inventor: Richard P. Bocker, San Diego, Calif.
[73] Assignee: The United States of America as represented by the Secretary of the Navy, Washington, D.C.
[21] Appl. No.: 758,624
[22] Filed: Jan. 12, 1977
[51] Int. Cl.² .............................................. G02B 5/20
[52] U.S. Cl. .............................. 350/162 SF; 350/154; 365/119
[58] Field of Search ............ 350/147, 154, 159, 160 P, 350/162 SF; 340/173 CC

[56] References Cited

U.S. PATENT DOCUMENTS

| 3,535,021 | 10/1970 | Amodei | 350/160 P X |
| 3,700,902 | 10/1972 | Buchan | 350/162 SF X |
| 3,771,150 | 11/1973 | Schneider | 350/160 P X |
| 3,846,764 | 11/1974 | Schneider | 350/160 P X |

*Primary Examiner*—John K. Corbin
*Assistant Examiner*—John D. Lee
*Attorney, Agent, or Firm*—R. S. Sciascia; G. J. Rubens; J. W. McLaren

[57] ABSTRACT

A complex spatial filter is provided by the combination of two dichroic crystal plates, one quarter waveplate, and two linear polarizers. The complex spatial filter consists of real and imaginary parts, both of which can have either a positive or negative sign and the structure is capable of eraseably recording varying degrees of absorbency which exhibit polarization discrimination in a desired format that can then be used to process the Fourier transform of a light beam containing desired information.

7 Claims, 11 Drawing Figures

COMPLEX PHOTODICHROIC SPATIAL FILTER

BACKGROUND OF THE INVENTION

Figures 1, 2:
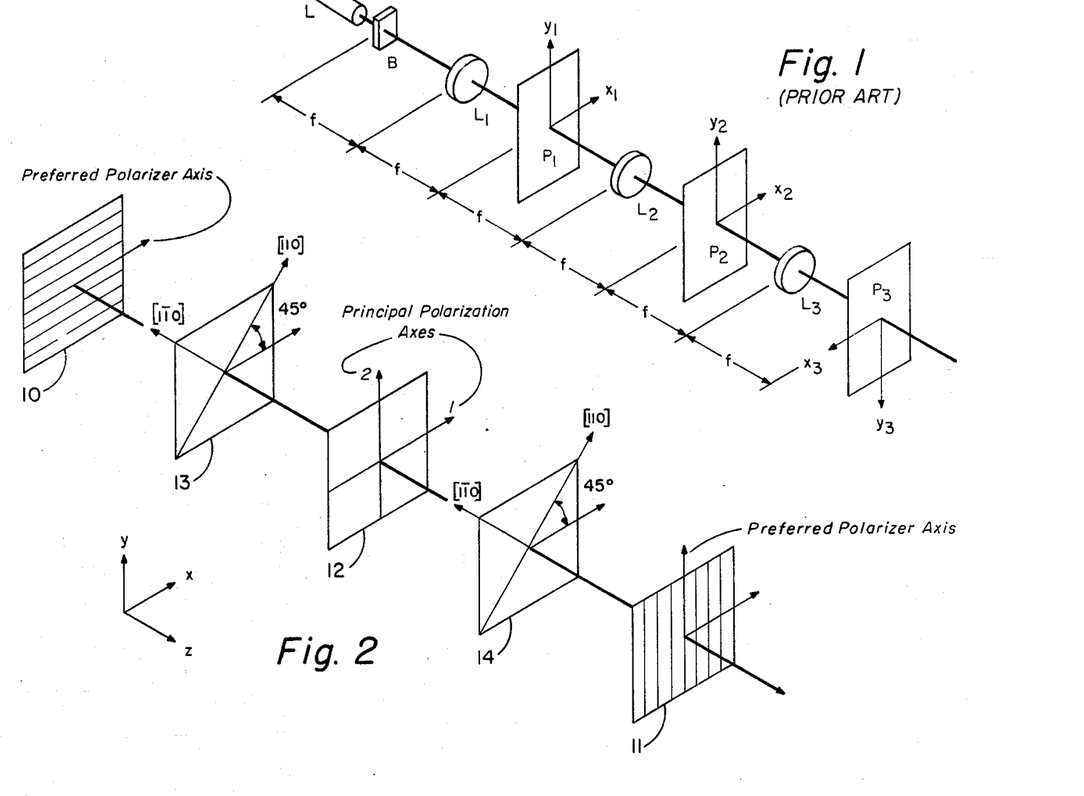
FIG. 1 is a schematic illustration of a prior art complex spatial filtering technique as used in a coherent optical processing system.
FIG. 2 is a schematic, exploded illustration of the complex spatial filter of the present invention.

Much of the past work in the area of coherent optical processing has been performed since the development of the laser, currently a convenient source of highly intense coherent radiation. Coherent optical processing systems may take a variety of basic configurations, depending on the intended use. A prior art coherent processing system is schematically illustrated in FIG. 1.

In its operation a narrow collimated beam of coherent radiation from the laser source (L) passes through a beam expander (B) and is recollimated by the lens ($L_1$). The resulting collimated beam of light illuminates an object transparency located in the input plane ($P_1$). The object transparency contains in a two-dimensional format the information that is to be processed. The light amplitude distribution appearing in the back focal plane ($P_2$) of lens $L_2$ is proportional to the two-dimensional Fourier transform of the amplitude transmittance of the input object transparency. The actual processing of information is performed in plane $P_2$. In this plane is located a spatial filter which is capable of modifying the amplitude and phase of the resulting Fourier spectrum associated with the input object transparency. Plane $P_2$ is commonly referred to as the spatial filtering plane. The final lens ($L_3$) in the system performs a Fourier transform of the modified object spectrum yielding in the output image plane ($P_3$) the desired processed version of the original input object information.

One area in coherent optical processing where much research and effort has been devoted is in the realization of optical spatial filters. This is understandable in consideration of the fact that the spatial filter is perhaps the most important optical component in the system since it dictates the nature of the processing operation to be performed. In order that an optical spatial filter be useful for both light amplitude and phase manipulations, it is necessary that the filter have a complex-amplitude transmittance. Since conventional optical recording media respond only to light intensity, a real-positive quantity, the physical realization of complex spatial filters is a much involved process.

There are three well known techniques for the realization of complex spatial filters. In 1964 Vander Lugt developed a technique for recording a complex-valued spatial frequency function as a real-positive valued function on a spatial carrier frequency. With this technique, a complex filter function can thus be represented by an absorption pattern on conventional recording media like photographic film. The actual recording of the filter does require the use of an optical interferometer.

However, there are two principal limitations of the Vander Lugt technique. Firstly, the recording medium required for the synthesis of the filter must have high resolution capacity to accommodate the high spatial frequency content of the reference carrier. Secondly, the uncompensated output image in the output plane of the processor actually consists of four terms, with the desired filtered terms appearing off the axis of the optical processing system.

Another technique developed by Brown and Lohmann in 1966 avoids the complications involved in recording a complex filter using interferometric techniques and relaxes the requirements for the need of a high-resolution recording medium. This particular technique involves using a computer guided plotter to initially draw the desired complex filter in terms of a real-positive binary array representation. The resulting computer plot is then minified and recorded on photograhic film, yielding the desired complex filter. This technique, like the Vander Lugt technique, has the limitation that the filtered image appears off axis.

Another prior art technique, utilizes the polarization discrimination properties of Vectograph film to take advantage of the two-channel capacity inherent in polarized light for separate carriers of information. This technique was initially employed by Holladay and Gallatin in 1966 for controlling the sign of a real filter function.

Based on a theoretical analysis of the interaction of polarized light with Vectograph film, Marathay in 1969 derived general solutions for the realization of both real bipolar and complex spatial filters. This latter technique has the advantage that only one image term appears in the output plane of the processor, namely the desired filtered output, and that it appears on the axis of the optical processing system. The principal disadvantage of Vectograph film is that four sheets of film are required for the synthesis of a complex filter. Also, Vectograph film has a spatial cutoff frequency of about 250 lpm and can be recorded on only once.

There are a number of application areas where coherent optical processing offers significant advantages over their electronic counterparts. Image enhancement, pattern recognition, word recognition, fingerprint identification, Chromosome spread detection, communication processing, earth resources analysis, land-use analysis, broadband radar signal processing, sonar signal processing, seismology, antenna pattern analysis, and signal analysis are typical of such applications.

However, many new application areas would open up to coherent optical processing if a reusable write-read-erase optical medium were available. The rapidly advancing field of optical materials research offers the possible solution for the need of active recording media in coherent optical processing systems. During the past few years, new optical materials have demonstrated their potential as reusable recording media, but not without exhibiting their limitations also. This is evidenced by the proliferation of articles appearing in print addressing the need for active recording media.

One particular medium, namely the alkali-halide crystal containing anisotropic color centers, offers the potential for satisfying the need of a reusable write-read-erase recording medium in coherent optical processing systems. In particular, these materials which have come to be known as photodichroic crystals can be used in spatial filtering. Advantageously only two photodichroic crystal plates are required for the synthesis of complex spatial filters, not four as is the case with Vectograph film. In addition, photodichroic crystals have spatial frequency cutoffs greater than 1000 lpm.

SUMMARY OF THE INVENTION

In the field of optical physics the terms "principal axis" and "principal transmittance", are commonly used to apply to any optical device whose optical transmission characteristics depend on the state of polarization of the interacting light. The present invention is concerned with only linearly polarized states of light. The principal axes of a polarizing device physically corresponds to a set of orthogonal axes in the plane of the device which is orthogonal to the direction of light propagation within the device. These axes define the directions corresponding to those linearly polarized states of light which are unaffected by the device. That is, if a linearly polarized beam of light passes through the device and its electric field vector lies in a direction corresponding to one of the two principal axes, then the device will have no effect on that light beam's state of polarization. Thus, there are two possible states of polarization for which this is true. Any other state of polarization would be altered by the device. The linear polarizer, quarter waveplate, and photodichroic crystals which make up the complex filter of this invention are all examples of devices exhibiting polarization discrimination properties which shall be referred to in terms of "principal polarization axes".

The present invention contemplates a complex spatial filter employing the polarization discrimination properties of anisotropic color centers in alkali-halide crystals. The filter is used in coherent optical processing systems and has the capability of being recycled through many write, read, and erase operations.

The use of the photodichroic crystal in coherent optical processing has two highly desirable advantages. Firstly, these crystals have the capability of being recycled through many write, read, and erase operations, thus making them ideally suited as an active optical processing medium. Secondly, these crystals have polarization discrimination properties which makes it possible to take advantage of the two-channel capacity inherent in polarized light to obtain separate carriers of information for purposes of optical processing. Two-channel processing is unique in that there is no need for a separate reference beam and it offers the advantage of on-line operation.

The present invention contemplates a complex spatial filter employing polarization discrimination properties of photodichroic crystals. In accordance with the teaching of the present invention, two photodichroic crystal plates and a compensating quarter waveplate between two linear polarizers are employed.

The input polarizer is used to prepare the state of polarization of the incoming light beam that is to be spatially filtered and processed by the complex spatial filter combination. The input and output linear polarizers are arranged so that their principal polarization axes are orthogonally related to each other.

Additionally, the principal polarization axes of two photodichroic crystal plates positioned on either side of the quarter waveplate must be oriented at 45° to the principal polarization axes of the compensating waveplate. The relative phase difference produced by the transmission of light energy through the compensating waveplate should be equal to $\pm \pi/2$, i.e., a quarter waveplate.

Accordingly, the present invention contemplates two photodichroic crystal plates and a quarter waveplate used in a composite structure with two linear polarizers as described. The resultant complex spatial filter is employed for coherent optical processing applications in which the fraction of anisotropic color centers along the front face principal polarization axes of each of the crystals at each point $(x, y)$ determines the optical transmission characteristics of the complex filter which may be described by $F(x,y)$, for the "read" light (or processing light).

The fraction of anisotropic color centers along the principal polarization axes may be altered by using light of a shorter wavelength. The shorter wavelength light can be used for both the "write" and "erase" operations which renders the complex spatial filter of the present invention reuseable to record different absorbency matrixes for an indefinite number of times.

Accordingly, it is a primary object of the present invention to provide an improved complex spatial filter for coherent optical processing applications which obviates disadvantages of functionally comparable prior art complex spatial filters.

Another object of the present invention is to provide such a complex spatial filter which in operation will produce an output consisting of only one term which is the term of primary interest in processing the Fourier transform of information contained in a beam of coherent light.

Another object of the present invention is to provide a complex spatial filter which produces a processed output term that lies on the axis of the optical processing system.

Another important object of the present invention is to provide a complex spatial filter which employs only two photodichroic crystal plates.

A further object of the present invention is to provide a complex spatial filter which avails of the recyclable characteristic of photodichroic crystal plates rendering the filter capable of being recycled through many read-write-erase operations.

Yet a further object of the present invention is to provide a complex spatial filter which is capable of significantly improved resolution in its operation, consistent with the resolution capabilities of photodichroic crystals.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

The present invention contemplates a complex spatial filter using a combination of two photodichroic crystal plates, one quarter waveplate, and two linear polarizers. A complex spatial filter consists of real and imaginary parts, both of which can change sign. The geometry for an embodiment of the present invention is illustrated in FIG. 2 in exploded schematic form. In practice the photodichroic crystal plates and the quarter waveplate would preferably be in physical contact, forming a single unit. The input and output polarizers are used for the preparation and detection processes, respectively.

To facilitate an understanding of a detailed description of the composite structure, it is appropriate to first give a brief description of each of the components making up the composite device. The two linear polarizers 10 and 11 are commercially off-the-shelf components and could be, for example, of the sheet-type variety currently used in polaroid sunglasses. Sheet-type or dichroic polarizers are made of dichroic materials, which are birefringent materials in which one of the two orthogonal polarizations is subject to strong absorption, while the other polarization is not. The transmission T of a single sheet polarizer in a beam of linearly polarized incident light is given by $$T = k_1\cos^2(\theta) + k_2\sin^2(\theta) \quad (1)$$

where $\theta$ is the angle between the plane of polarization of the incident beam (i.e., the plane of the electric field vector of the incident beam) and the plane of preferred transmission of the polarizer, $k_1$ and $k_2$ are the principal transmittances of the polarizer, and both are functions of wavelength. Ideally, $k_1 = 1$ and $k_2 = 0$ will be assumed in this discussion.

Figure 3:
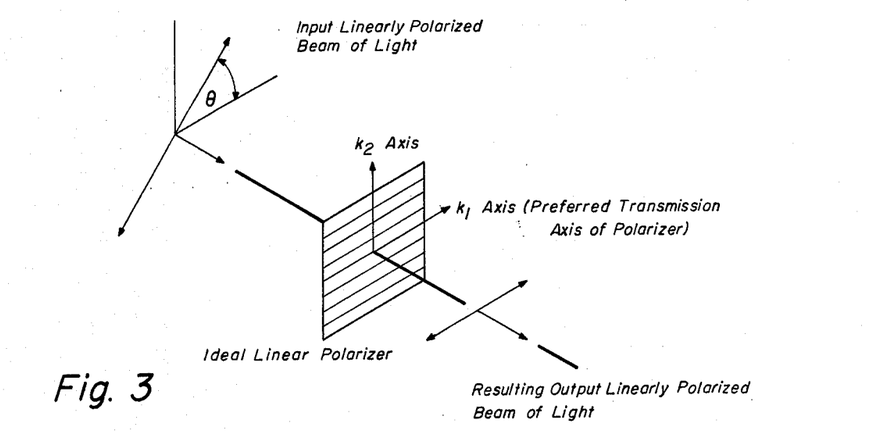
FIG. 3 is an illustration of the functional characteristics of an ideal linear polarizer.

FIG. 3 depicts in more specific detail the interaction of an ideal polarizer (where $k_1 = 1$ and $k_2 = 0$) in its interaction with an incident linearly polarized beam of light in relation to the terms of Equation (1).

The quarter waveplate 12 of FIG. 2 which is required in the composite structure is also a commercially off-the-shelf component. The quarter waveplate, like other retardation plates, in its simplest form may be a slice cut out of a uniaxial crystal such that the slice contains the crystalline optic axis. Within the plane of the waveplate, the crystalline optic axis and another axis normal to it are often called the principal polarization axes of the device.

Figure 4:
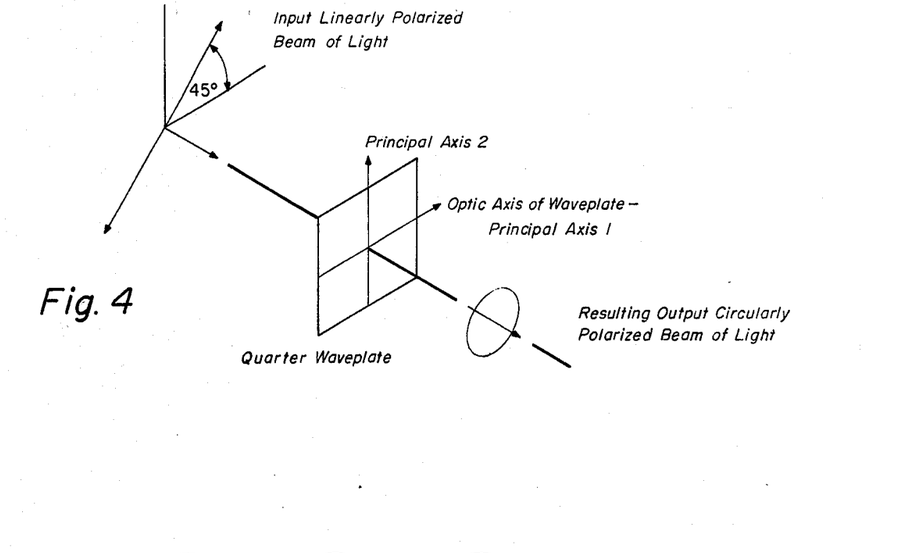
FIG. 4 is an illustration of the operative characteristics of a quarter waveplate.

The quarter waveplate 12 has the property of introducing a quarter of a wavelength shift between two orthogonal components making up an arbitrary polarized beam of light traversing the device. The orthogonal components are in particular those whose directions are specified by the principal polarization axes of the quarter waveplate. Thus, for example, if the angle $\theta$ between the electric field vector of an incident linearly polarized beam and the quarter wave plate's principal planes is 45 degrees, then the emergent beam of light is circularly polarized as illustrated in FIG. 4. Reversing the direction of propagation, a quarter waveplate will transform circularly polarized light into linearly polarized light.

The two photodichroic crystal plates 13 and 14 required in the composite structure of FIG. 2 are the most important components making up the complex filter. The reason for this is that it is these crystals which have encoded on them the complex filter information. A photodichroic crystal is an alkali halide crystal containing anisotropic color centers. The term photodichroic crystal was first used in a paper dealing with the rotational properties of anisotropic color centers as a basis for the storage of information (Schneider, Marrone, and Kabler, 1970). Since then this term has come into common usage.

Alkali halide crystals are ionic compounds, most of which crystallize in the rocksalt structure. In this crystalline structure each alkali metal ion is surrounded by six nearest-neighbor halogen ions. Similarly, each halogen ion is surrounded by six nearest-neighbor alkali metal ions. The crystal is thus face-center cubic, the basis consisting of one alkali metal ion and one halogen ion separated by half the body diagonal of a unit cube. Alkali halide crystals, free from defects and chemical impurities, exhibit an extraordinarily wide range of optical transparency ranging from the far ultraviolet to the far infrared (Schulman and Compton, 1962). As Schulman and Compton point out, the alkali halide crystals can be described as typical insulators, in the band picture of solids, in terms of their optical and electrical properties. The band gap between the valence band and the conduction band is on the order of 10 eV. The introduction of chemical impurities in these crystals often gives rise to localized energy levels in the forbidden band. Electronic excitations between these impurity localized energy levels and the valence or conduction bands lead to absorption bands in the normally transparent spectral region.

Figure 5:
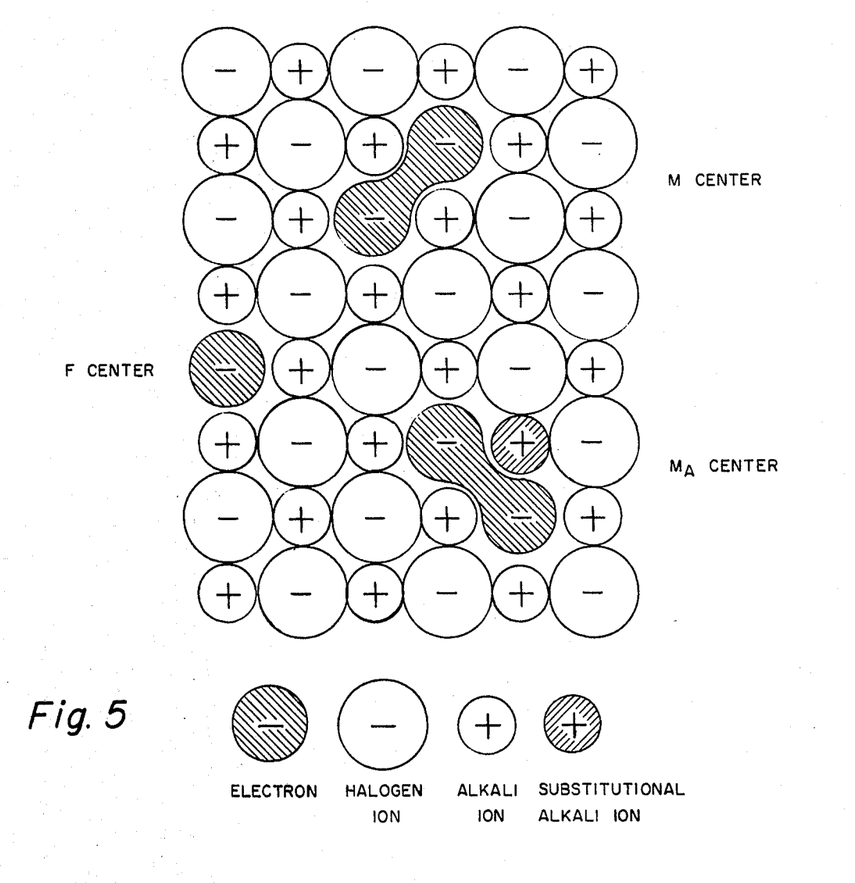
FIG. 5 is a schematic representation of the atomic models of the F, M, and $M_A$ centers.

A number of different types of color centers can be created within an alkali halide crystal. An excellent discussion of the various types of color centers, with their methods of production, is given by Schulman and Compton in 1962. Of the various types of color centers, the concept of the present invention is concerned in general with only three simple excess electron centers, namely the isotropic F center and the anisotropic M and $M_A$ centers with emphasis being placed on the M center. Their atomic models are well established (Compton and Rabin, 1964) and are illustrated in FIG. 5. The F center is an electron trapped at an anion vacancy site; the M center consists of two F centers occupying nearest-neighbor sites, and the $M_A$ center is an M center next to an alkaliion impurity. Because much of the discussion on M centers is applicable to $M_A$ centers, it is only necessary to comprehend a description of the M center to appreciate the operation of the present invention.

Figure 6:
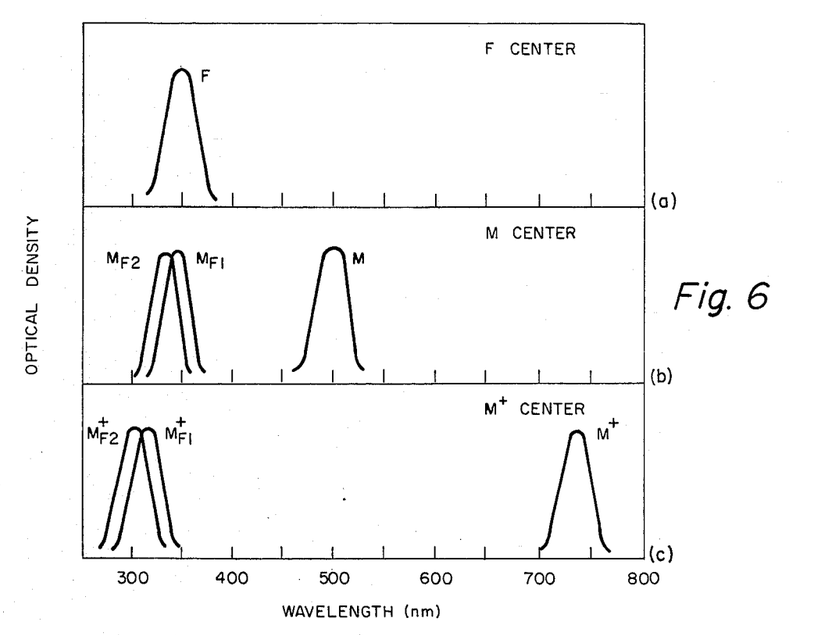
FIG. 6 is an illustration of the absorption bands associated with the color centers in NaF where waveform (a) represents F center, waveform (b) represents M center, and waveform (c) represents M$^+$ center.

Two absorption bands of primary importance in optical processing are associated with M center absorption. These have been designated the M and $M_F$ bands. As shown in FIG. 6, they are distinct and well separated. The M band is a single transition usually lying in the visible or near infrared spectral region, whereas the $M_F$ band consists of two overlapping transitions occurring at shorter wavelengths. The two overlapping transitions, designated $M_{F1}$ and $M_{F2}$, usually lie in the same spectral region as the F band which is associated with F center absorption. The absorption bands associated with the M center are polarization dependent. In fact, each of the M center absorption bands has associated with it a distinct optical dipole moment whose directions correspond to definite crystallographic directions dictated by the symmetry axis of the M center. The symmetry axis is defined as that axis connecting the two F centers comprising the M center.

Figure 7:
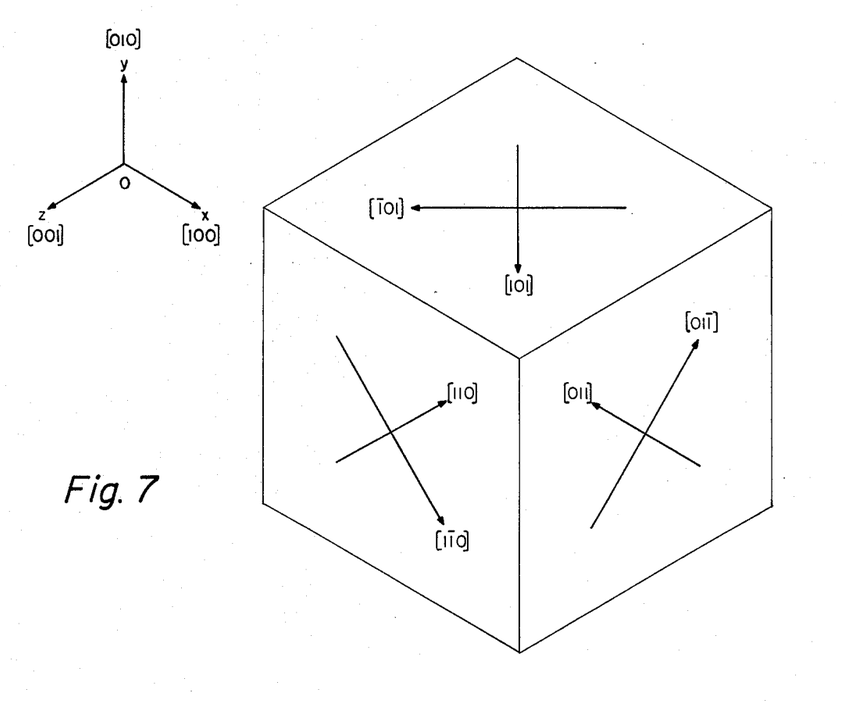
FIG. 7 is a schematic illustration of the six possible orientations an M center may have in an alkali halide crystal lattice.

Because of the cubic structure of the alkali halide host crystal, there are a total of six possible orientation directions an M center can have within the crystal structure. Adopting the Miller index notation (see for example Kittel, 1967), these orientation directions are specified by [110], [1$\bar{1}$0], [101], [$\bar{1}$01], [011], and [01$\bar{1}$] as depicted in FIG. 7.

Figure 8:
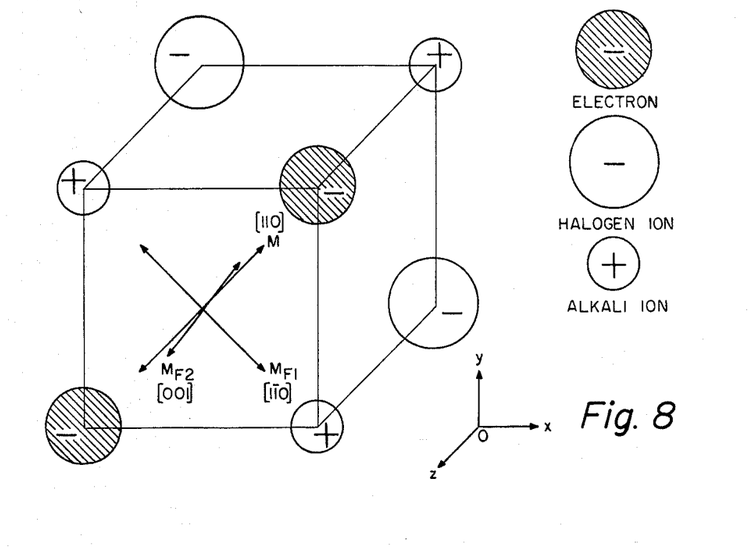
FIG. 8 is a schematic illustration of the orientations of the M, $M_{F1}$, and $M_{F2}$ optical dipole moments relative to an M center in the [110] orientation state.

Shown in FIG. 8 are the orientations of the three dipole moments previously described associated with an M center oriented along the [110] direction. The moment associated with M band absorption lies along the symmetry axis of the M center, in this case [110]. The two moments associated with the $M_F$ band absorption lie along directions orthogonal to the symmetry axis. These directions are given by [1$\bar{1}$0] and [001] for the $M_{F1}$ and $M_{F2}$ bands, respectively.

One of the most interesting and useful properties of the M center is that polarized light in the $M_F$ spectral region can actually induce M centers to reorient if the electric field vector of the $M_F$ band light has a component directed along either of the dipole moments associated with $M_F$ band absorption. Also of interest is the fact that M band light has little or no effect upon the reorientation of M centers, at least for the case of the materials KCl and NaF. The reorientation mechanism has been studied extensively by Schneider in 1970 and 1971 for the case of M and $M_A$ centers in KCl and by Collins and Schneider in 1972 for the case of M centers in NaF. In all cases it was found that the $M^+$ (or $M_A{}^+$) center played a key role in the reorientation process. The $M^+$ center is a singly ionized M center. The actual process involves M center absorption and ionization, followed by $M^+$ center absorption, reorientation, and electron capture. Burt in 1972 conveniently expressed this process in the form:

(Orientation 1)  (Orientation 2)

The fact that M band light has no effect in the reorientation process does not preclude its usefulness. On the contrary, the interaction of M band light with the photodichroic crystal can be useful in revealing what effects $M_F$ band light has on the crystal. That is, $M_F$ band light can be used to alter the orientational distribution of the anisotropic M center, whereas M band light can be used for interrogating, not altering, the resulting M center distribution. It is these properties of photodichroic crystals that make them especially attractive as an optical recording or processing medium. Schneider in 1967 was, perhaps, the first to recognize the potential usefulness of the photodichroic crystal for information storage applications. He proposed that the orientation of anisotropic color centers within a photodichroic crystal could serve as the basis for information storage. Thus $M_F$ band light could be used for writing and erasing information within these crystals and M band light could be used to nondestructively readout this stored information.

With this brief description of each of the components making up the composite complex filter structure of the present invention, a better understanding may be had of a description of the filter itself and its use in a coherent optical processing system. In order that the composite filter structure depicted in FIG. 2 be of any utility, it is imperative that two wavelengths of light be employed. One wavelength, designated $\lambda_w$, is used for the purpose of writing and erasing information within the photodichroic crystals. The wavelength $\lambda_w$ would lie within the $M_F$ absorption band of the anisotropic M center. The second wavelength, designated $\lambda_r$, is used for the purpose of nondestructively reading information out of the photodichroic crystal after it has been recorded in the crystal with $\lambda_w$ light.

The $\lambda_r$ wavelength should lie within the M absorption band of the M center. It is the wavelength $\lambda_r$ which is actually used in a coherent optical processing system such as is illustrated in FIG. 1 for the purpose of information processing, i.e. reading only. The $\lambda_w$ light is used to change the optical transmission characteristics of the complex spatial filter, i.e., writing only.

The actual use of the photodichroic crystal in an active coherent optical processing system involves a three step process; namely (a) writing the complex filter information within the photodichroic crystal with $\lambda_w$ light, (b) processing the input information in plane $P_1$ as illustrated in FIG. 1 via the complex filter and Fourier transforming lenses using $\lambda_r$ light, and (c) erasing the contents of the complex filter with $\lambda_w$ light in preparation for new filter information. Each of these steps will now be described in greater detail.

Figure 9:
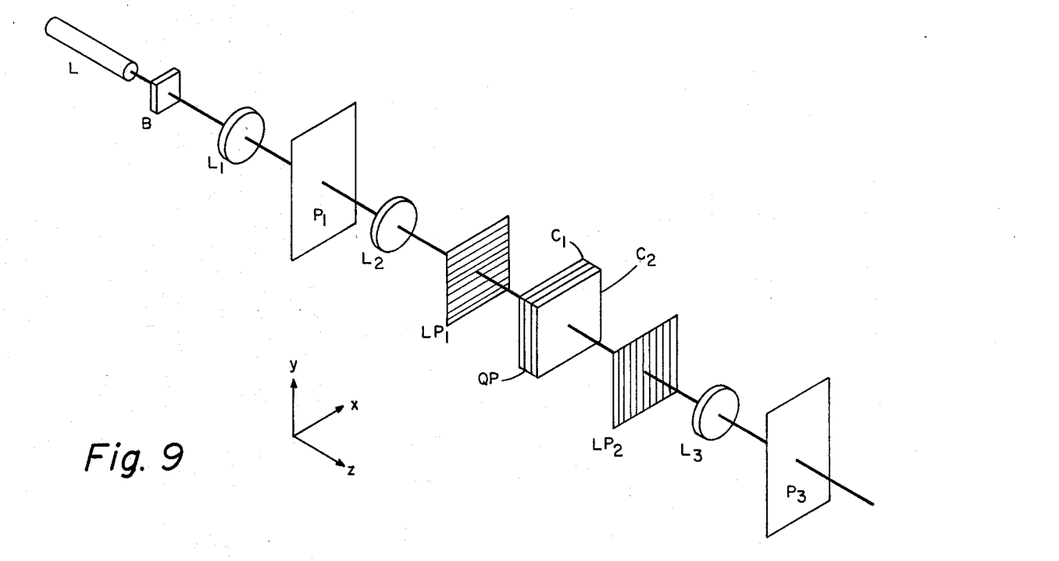
FIG. 9 is a schematic illustration of a coherent optical processing system employing the complex spatial filter of the present invention.

First consider the step involving the processing of information contained in the input plane $P_1$ of the system illustrated in FIG. 1. It is assumed at this stage that the complex filter information has been encoded in the complex filter prior to this processing step. FIG. 9 is identical to FIG. 1 except that now the complex spatial filter of the present invention is included in the figure.

This portion of the system depicted is concerned with the processing operation only. Note that light propagation is from left to right along the z-direction. As previously described, a narrow collimated beam of coherent radiation of wavelength $\lambda_r$ from the laser source (L) passes through a beam expander (B) and is recollimated by the lens ($L_1$). The resulting collimated beam of light illuminates an object transparency located in the input plane ($P_1$). The object transparency contains in a two-dimensional format the information that is to be processed. The light passing through the object transparency is collected by the Fourier transforming lens ($L_2$). The light amplitude distribution appearing in the back focal plane of lens $L_2$ is proportional to the two-dimensional Fourier transform of the amplitude transmittance of the input object transparency.

Located in the back focal plane of the Fourier transform lens $L_2$ is the complex filter consisting of two photodichroic crystals ($C_1$) and ($C_2$) containing the complex filter information and a quarter waveplate (QP). For a detailed illustration of the geometry of the filter refer to FIG. 2. Between the Fourier transform lens $L_2$ and its back focal plane is located a linear polarizer ($LP_1$) whose preferred transmission axis points in the x-direction. This input polarizer is used to prepare the state of polarization of the incoming light beam that is to be spatially filtered by the complex spatial filter combination.

If $\phi_i(x,y)$ is the mathematical function associated with the Fourier transform of the information contained in plane $P_1$, then the Jones vector representation of the amplitude distribution in the back focal plane of lens $L_2$ which serves as the input to the complex filter is given by $$\hat{\xi}_i(x,y) \begin{bmatrix} 1 \\ 0 \end{bmatrix}. \quad (2)$$

This Jones vector representation describes a beam of linear polarized light whose electric field vector lies in the x-axis. The light beam emerging from the complex filter combination is passed through the output linear polarizer (LP$_2$) whose preferred transmission axis points in the y-direction. The Jones vector representation associated with the output beam of the complex filter is given by $$\hat{\xi}_o(x,y) = \psi_o(x,y) \begin{bmatrix} 0 \\ 1 \end{bmatrix}. \quad (3)$$

The amplitude distribution $\phi_o(x,y)$ represents the spatially filtered version of the amplitude distribution $\phi_i(x,y)$. The amplitudes $\phi_o(x,y)$ are related through the equation $$\phi_o(x,y) = F(x,y) \phi_i(x,y), \quad (4)$$

where the mathematical function $F(x,y)$ corresponds to the complex amplitude transmittance of the photodichroic spatial filter. The final lens (L$_3$) in the system performs a Fourier transform of the modified object spectrum $\phi_o(x,y)$ producing the desired processed version of the original input object information at a photosensitive array schematically represented at the output plane (P$_3$).

The filter function $F(x,y)$ in Equation (4) is related to the matrix elements $l_{ij}$ of the Jones operator describing the complex filter represented in FIG. 2 by the equation $$F(x,y) = (0 \ 1) \begin{bmatrix} l_{11} & l_{12} \\ l_{21} & l_{22} \end{bmatrix} \begin{bmatrix} 1 \\ 0 \end{bmatrix} \quad (5)$$

which reduces to the simplified expression $$F(x,y) = l_{21}. \quad (6)$$

General expressions have been derived for the matrix elements $l_{ij}$ for the most general case when the two linear polarizers in the filter combination have arbitrary angular orientation about the z-axis. The two photodichroic crystal plates also have arbitrary angular orientation about the z-axis and the birefringent waveplate introduces an arbitrary relative phase shift. The resulting general solutions were specialized to optimize the result in accordance with the teaching of the present invention. That optimum result is summarized in FIG. 2.

In summary, the concept of the present invention requires: (1) the linear polarizers must be crossed, that is the preferred axis of transmission of each of the linear polarizers must be at right angles; (2) The principal polarization axes of the birefringent waveplate in the composite structure must be parallel to the principal transmittance axes of the linear polarizers in the complex filter structure. (3) The relative phase difference of the birefringent waveplate should be equal to $\pm \pi/2$, that is, a quarter waveplate. (4) The principal polarization axes of the two photodichroic crystal plates must be parallel and angularly oriented about the z-axis by an amount 45° to the axes of the quarter waveplate.

The principal polarization axes of the photodichroic crystal plates for this complex filter structure correspond to the directions [110] and [1$\bar{1}$0]. For this optimum result it was found that the complex filter function $F(x,y)$ is given by $$F(x,y) = F_r(x,y) - j F_i(x,y). \quad (7)$$

The quantity $j$ is equal to $(-1)^{1/2}$ and the functions $F_r(x,y)$ and $F_i(x,y)$ are real functions given by $$F_r(x,y) = k [f_1(x,y) - f_2(x,y) + f_1'(x,y) - f_2'(x,y)] \quad (8)$$

$$F_i(x,y) = k [f_1(x,y) - f_2(x,y) - f_1'(x,y) + f_2'(x,y)] \quad (9)$$

where $k$ is a real positive constant of proportionality.

The quantities $f_1(x,y)$ and $f_2(x,y)$ represent the fraction of anisotropic M centers aligned along the directions [110] and [1$\bar{1}$0], respectively, of the photodichroic crystal plate labelled C$_1$ at the point $(x,y)$. Similarly, the quantities $f_1'(x,y)$ and $f_2'(x,y)$ represent the fraction of anisotropic M centers aligned along the directions [110] and [1$\bar{1}$0], respectively, of the photodichroic crystal plate labelled C$_2$. For completeness, if $F(x,y)$, or equivalently $F_r(x,y)$ and $F_i(x,y)$ from Equation (7), is the desired filter function to be encoded in the complex filter structure of FIG. 2, then from Equations (8) and (9) it can be shown that the distribution of M centers in the two crystals must satisfy the equations $$f_1(x,y) - f_2(x,y) = (\tfrac{1}{2}k) [F_r(x,y) + F_i(x,y)] \quad (10)$$

$$f_1'(x,y) - f_2'(x,y) = (\tfrac{1}{2}k) [F_r(x,y) - F_i(x,y)] \quad (11)$$

Thus, given $F_r(x,y)$ and $F_i(x,y)$, Equation (10) defines what the difference in the fraction of M centers oriented along the [110] and [1$\bar{1}$0] directions at each point $(x,y)$ in crystal C$_1$ must be and Equation (11) indicates what the difference in the fraction of M centers lying along the [110] and [1$\bar{1}$0] directions at each point $(x,y)$ in crystal C$_2$ must be if the complex filter structure is to have an amplitude transmission given by $F(x,y)$.

Accordingly, if the distribution of color centers is controlled at each point $(x,y)$ in each of the two photodichroic crystals independently, the means and technique for fabricating and using a complex spatial filter as depicted in FIG. 2 have been operationally disclosed and defined.

The desired result is achieved because the functions $f_1(x,y) - f_2(x,y)$ and $f_1'(x,y) - f_2'(x,y)$ appearing in Equations (10) and (11) can be controlled by the exposure and state of linear polarization of a beam light of wavelength $\lambda_w$ at each point $(x,y)$ in the photodichroic crystals C$_1$ and C$_2$, respectively. There remains then a definitive method and means teaching how to "write" information into these crystals with light of wavelength $\lambda_w$ in accordance with the concept of the present invention.

Figure 10:
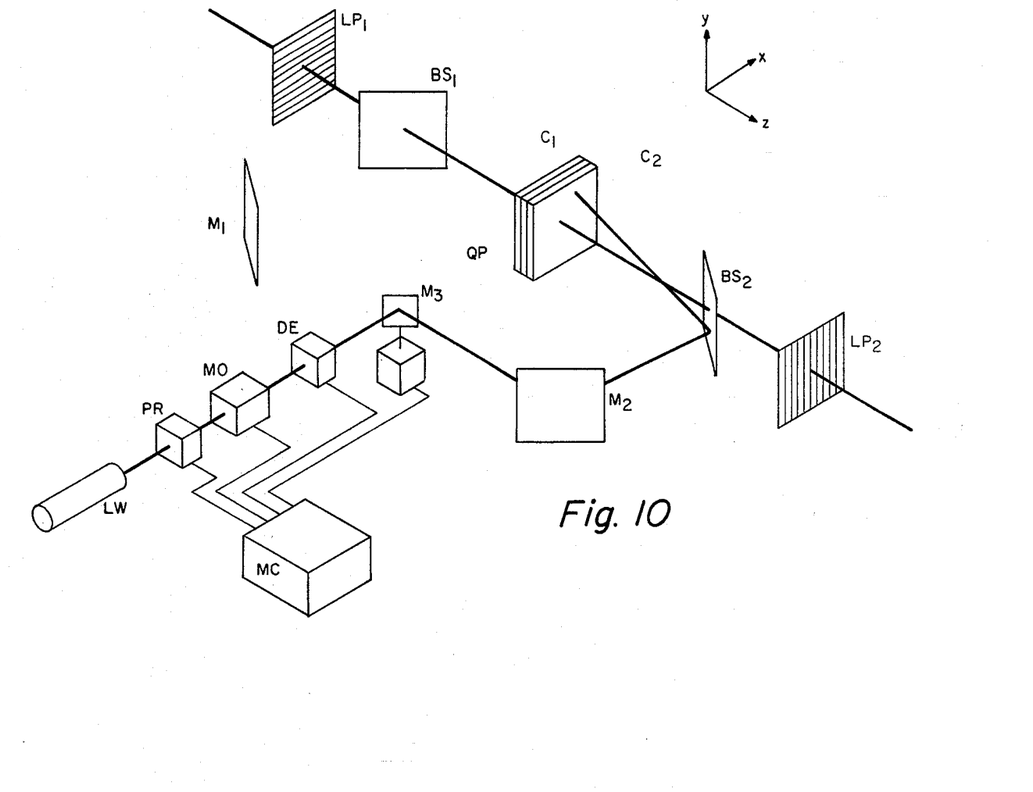
FIG. 10 is a schematic illustration of an optical system for encoding information on the complex spatial filter of the present invention in its "write" mode of operation.

FIG. 10 schematically illustrates one possible system for "writing" the complex filter information $F(x,y)$ on the complex spatial filter element consisting of the two photodichroic crystal plates C$_1$ and C$_2$. Shown in this figure is an auxiliary optical system consisting of two beam splitters (BS$_1$) and (BS$_2$), two fixed mirrors (M$_1$) and (M$_2$), a mirror (M$_3$) mounted on a deflecting galvanometer, an x-y beam deflector (DE), a temporal optical modulator (MO), a polarization rotator (PR), a laser (LW) of wavelength $\lambda_w$, and a minicomputer (MC). Also shown in this figure are the two linear polarizers (LP$_1$) and (LP$_2$), the two photodichroic crystal plates (C$_1$) and (C$_2$), and the quarter waveplate (QP) which were depicted in FIGS. 2 and 9.

The basic operation of this system is as follows: A narrow collimated beam of laser light of wavelength $\lambda_w$ from the laser source (LW) is used to encode the information about F(x,y) on both of the photodichroic crystal plates (C$_1$) and (C$_2$). However, the laser (LW) is able to encode information on only one crystal at a time. Which crystal is written on would be dictated by the angular position of mirror M$_3$. Mirror M$_3$ is mounted on a deflecting galvanometer which has the ability to position the mirror M$_3$ in one of two possible orientation states. In the first orientation state, the mirror M$_3$ would deflect the beam of light of wavelength $\lambda_w$ in such a manner that it strikes crystal C$_1$. In the other orientation state, illustrated in FIG. 10, the mirror M$_3$ would deflect the beam of light such that it impinges on crystal C$_2$. Thus mirror M$_3$ controls which of the two crystals receives the beam from laser (LW).

The deflecting galvanometer may be, for example, under the electronic control of the mini-computer (MC). The output of the laser source (LW) is linearly polarized such that its electric field vector lies in the vertical y-direction. The polarization rotator (PR) is capable of rotating the plane of polarization of the light beam $\lambda_w$ by some designated and controllable amount. For this particular system it would be desirable for the rotator to be able to rotate the plane of polarization of the light beam by plus or minus 45 degrees about the direction of light propagation. The desired function is the capability of directing light to either crystal C$_1$ or C$_2$ with a light beam of wavelength $\lambda_w$ whose linear state of polarization could be parallel to either of the two principal polarization axes of either crystal.

The polarization rotator (PR) may also be under minicomputer control. The temporal optical modulator (MO) is capable of modulating the light amplitude of the light beam $\lambda_w$ in some predetermined manner relative to time. Thus, the modulator is used for controlling the exposure level of the "write" light at the crystals. The x-y beam deflector (DE) is capable of changing the direction of light propagation in such a manner that the laser beam from (LW) is scanned, in a two-dimensional raster fashion, across the face of either crystal C$_1$ or C$_2$. Both the optical modulator (MO) and the x-y beam deflector (DE) may also be under minicomputer control. The mirrors (M$_1$) and (M$_2$) and beam splitters (BS$_1$) and (BS$_2$) are stationary passive optical components which complete the light paths to the two crystals.

The complex filter function F(x,y) information, as well as any other filter function information, may be conveniently stored within the memory of the minicomputer. Thus, with the appropriate written software commands it would be possible to take the filter information F(x,y) from the minicomputer memory and encode this information on the photodichroic crystals, via the laser beam $\lambda_w$ whose state of polarization, amplitude level, and direction of propagation could be altered by the components (PR), (MO), and (DE), respectively.

Figure 11:
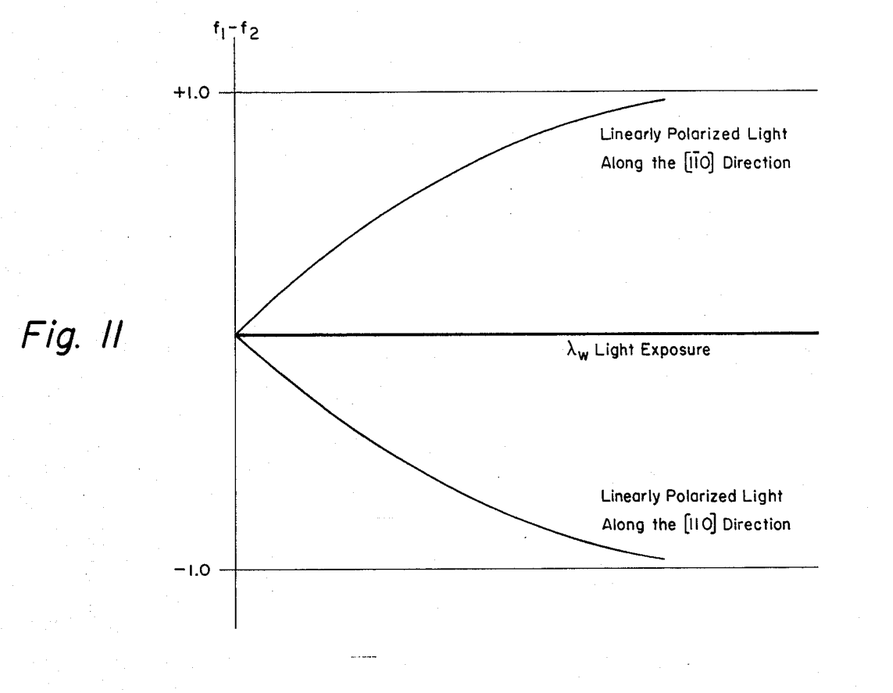
FIG. 11 is a illustration of how the difference fraction of M centers oriented along [110] and [1$\bar{1}$0] change as a function of the "write" light exposure and state of polarization.

Shown in FIG. 11 is a typical curve of how the difference in the fraction of M centers oriented along the [110] and [1$\bar{1}$0] directions changes as a function of the "write" light $\lambda_w$ exposure, and state of polarization. Thus, the appropriate exposure level and state of polarization (dictated by element PR) provides the capability of writing complex filter information, by means of controlling the orientation distribution of M centers, within the complex filter structure of FIG. 2.

The last step of the process inherently involved in the concept of the present invention concerns "erasing" information encoded in the complex filter in preparation for new filter information. This can readily be accomplished, for example, by exposing the photodichroic crystals to unpolarized light of wavelength $\lambda_w$. Such exposure has the effect of randomizing the orientational distribution of M centers within the crystals which may be defined as the "erased" state. A separate flashlamp with spectral content in the M$_F$ band, under minicomputer control, may be suitably arranged, for example, for "erasing" information stored within the crystals.

Accordingly, it may be appreciated by those skilled and knowledgable in the pertinent arts that the present invention provides for processing a light energy Fourier transform, producing an output which consists of only one term, the term of interest.

Moreover, the processed output produced by and in accordance with the teaching and concept of the present invention advantageously and desirably lies on the axis of the processing system.

Additionally, only two photodichroic crystal plates are required in the structure of the complex spatial filter of the present invention and operationally recyclable functional characteristics of the photodichroic crystal materials are utilized to afford many successive read-write-erase operations.

Most desirably the photodichroic crystal plates provide typical resolution of one thousand lines per millimeter, much beyond the resolution capabilities of materials employed in many prior art techniques and structures.

Obviously many modifications and variations of the present invention are possible in the light of the above teachings. It is therefore to be understood that within the scope of the appended claims the invention may be practiced otherwise than as specifically described.

What is claimed is:

1. A complex spatial filter for reversibly recording a filter function F(x,y) having a real component F$_r$(x,y) and an imaginary component F$_i$(x,y) and contained in the information in a beam of coherent light energy comprising:

a first linear polarizer positioned to receive said beam of coherent light for transmitting only its light energy components of predetermined polarization;

a first dichroic crystal plate positioned contiguous and parallel to said first linear polarizer and responsive to the absorption of light energy of a known first bandwidth and a first determinable polarization of said beam of coherent light for causing a difference in the fraction of its M-centers oriented along the [110] and [1$\bar{1}$0] directions at each point (x,y) defined by $$f_1(x,y) - f_2(x,y) = (\tfrac{1}{2}k)$$

a quarter waveplate element positioned contiguous and parallel to said first dichroic crystal plate for causing a 90° phase change between the two orthogonally polarized components of coherent light energy emerging from said first dichroic crystal plate;

a second dichroic crystal plate positioned contiguous and parallel to said quarter waveplate element and responsive to the absorption of light energy of said known first bandwidth and a second determinable polarization of said beam of coherent light for causing a difference in the fraction of its M-centers oriented along the [110] and [1$\bar{1}$0] directions at each point $(x,y)$ defined by $$f_1'(x,y) - f_2'(x,y) = (\tfrac{1}{2}k)$$

where $k$ is a real positive constant of proportionality, said first and second dichroic crystal plates having their principal polarization axes oriented at 45° relative to the principal polarization axis of said quarter waveplate element;

a second linear polarizer positioned contiguous and parallel to said second dichroic crystal plate for transmitting light energy components orthogonally polarized relative to said components of predetermined polarization; and a source of light energy of said known first bandwidth and non-polarized state disposed to irradiate said first and second dichroic crystal plates for restoring their M-centers to substantially random orientation.

2. A complex spatial filter as claimed in claim 1 wherein said first and second linear polarizers, said first and second dichroic crystal plates, and said quarter waveplate element comprise a composite structure.

3. A complex spatial filter as claimed in claim 1 wherein said first and second dichroic crystal plates are comprised of alkali halide crystal material.

4. A complex spatial filter as claimed in claim 1 wherein said dichroic crystal plates ae comprised of NaF.

5. A complex spatial filter as claimed in claim 1 wherein said dichroic crystal plates are comprised of KCl.

6. A system for encoding information on a complex spatial filter as claimed in claim 1 and including optical means for controllably deflecting said beam of coherent light containing said information in a predetermined recording scanning format.

7. A system for extracting encoded information from a complex spatial filter as claimed in claim 1 and including means for directing said input beam of coherent light through said filter and photosensitive means arranged to detect the optical effect of said filter on said beam of coherent light.

* * * * *